United States Patent
Masur et al.

(10) Patent No.: US 9,914,443 B2
(45) Date of Patent: Mar. 13, 2018

(54) BRAKE SYSTEM FOR A VEHICLE

(71) Applicant: Robert Bosch GmbH, Stuttgart (DE)

(72) Inventors: Dagobert Masur, Flein (DE); Matthias Kistner, Bretzfeld (DE)

(73) Assignee: ROBERT BOSCH GMBH, Stuttgart (DE)

(*) Notice: Subject to any disclaimer, the term of this patent is extended or adjusted under 35 U.S.C. 154(b) by 129 days.

(21) Appl. No.: 14/780,441

(22) PCT Filed: Mar. 24, 2014

(86) PCT No.: PCT/EP2014/055834
§ 371 (c)(1),
(2) Date: Sep. 25, 2015

(87) PCT Pub. No.: WO2014/154631
PCT Pub. Date: Oct. 2, 2014

(65) Prior Publication Data
US 2016/0046272 A1    Feb. 18, 2016

(30) Foreign Application Priority Data

Mar. 28, 2013  (DE) .................. 10 2013 205 676
May 23, 2013   (DE) .................. 10 2013 209 613
Mar. 24, 2014  (DE) .................. 10 2014 205 431

(51) Int. Cl.
*B60T 13/68*     (2006.01)
*B60T 13/66*     (2006.01)
(Continued)

(52) U.S. Cl.
CPC .......... *B60T 13/686* (2013.01); *B60T 8/4081* (2013.01); *B60T 8/4086* (2013.01); *B60T 11/224* (2013.01);
(Continued)

(58) Field of Classification Search
CPC .... B60T 13/686; B60T 13/745; B60T 13/143; B60T 11/224; B60T 8/4086
See application file for complete search history.

(56) References Cited

U.S. PATENT DOCUMENTS 3,559,406 A * 2/1971 Gardner ............... B60T 13/565
                                                    60/549
3,910,048 A * 10/1975 Gardner ............... B60T 13/565
                                                    188/151 R
(Continued)

FOREIGN PATENT DOCUMENTS

CN  101896382 A   11/2010
DE  19620228      11/1997
(Continued)

OTHER PUBLICATIONS

International Search Report for PCT/EP2014/055834, dated Jan. 30, 2015.

*Primary Examiner* — Bradley T King
*Assistant Examiner* — James K Hsiao
(74) *Attorney, Agent, or Firm* — Norton Rose Fulbright US LLP; Gerard Messina

(57) ABSTRACT

A brake system for a vehicle, including: a master brake cylinder having a first chamber, a rod piston, which together with at least one first hydraulically active surface area, bounds the first chamber, a second chamber and a floating piston; the rod piston being configured with or couplable to a second hydraulically active surface area; the second hydraulically active surface area bounding an auxiliary chamber of the master brake cylinder or of another brake cylinder, and the auxiliary chamber being attached to an accumulator chamber and/or to the hydraulic reservoir via a first nonreturn valve and a restrictor that is configured in a further fluid line.

17 Claims, 10 Drawing Sheets

(51) Int. Cl.
  *B60T 13/74* (2006.01)
  *B60T 13/14* (2006.01)
  *B60T 8/40* (2006.01)
  *B60T 11/224* (2006.01)

(52) U.S. Cl.
  CPC .......... *B60T 13/143* (2013.01); *B60T 13/662* (2013.01); *B60T 13/745* (2013.01)

(56) References Cited

U.S. PATENT DOCUMENTS

| | | | |
|---|---|---|---|
| 4,244,185 A * | 1/1981 | Belart | B60T 13/144 60/550 |
| 5,970,710 A | 10/1999 | Dieringer | |
| 6,135,572 A | 10/2000 | Worsdorfer et al. | |
| 6,336,689 B1 | 1/2002 | Eguchi et al. | |
| 6,412,881 B1 * | 7/2002 | Isono | B60T 8/367 188/356 |
| 6,527,349 B2 * | 3/2003 | Arakawa | B60T 11/20 303/114.3 |
| 6,953,229 B2 | 10/2005 | Isono et al. | |
| 7,644,997 B2 | 1/2010 | Isono | |
| 8,544,962 B2 | 10/2013 | Ganzel | |
| 2002/0043875 A1 * | 4/2002 | Braun | B60T 8/4881 303/166 |
| 2005/0006950 A1 * | 1/2005 | Versteyhe | B60T 13/14 303/71 |
| 2009/0212621 A1 * | 8/2009 | Drott | B60T 8/38 303/14 |
| 2012/0235469 A1 * | 9/2012 | Miyazaki | B60T 8/4081 303/9.63 |
| 2013/0207451 A1 * | 8/2013 | Ohkubo | B60T 8/3655 303/9.62 |
| 2014/0345270 A1 * | 11/2014 | Weiberle | B60T 11/20 60/533 |
| 2015/0321651 A1 * | 11/2015 | Lhuillier | B60T 11/203 60/533 |

FOREIGN PATENT DOCUMENTS

| | | |
|---|---|---|
| DE | 102011006327 | 12/2011 |
| DE | 102011006327 A1 | 12/2011 |
| JP | 2001502985 A | 3/2001 |
| JP | 2002234427 A | 8/2002 |
| JP | 2003154930 A | 5/2003 |
| WO | WO2009/121645 | 10/2009 |

* cited by examiner

BRAKE SYSTEM FOR A VEHICLE

FIELD OF THE INVENTION

The present invention relates to a brake system for a vehicle.

BACKGROUND INFORMATION

The World Patent Application WO 2009/121645 A1 describes a hydraulic vehicle brake system. The master brake cylinder of the hydraulic vehicle brake system includes a first pressure chamber and a second pressure chamber. At an end that widens relative to the brake pedal, the master brake cylinder also has an integrated pedal travel simulator, whose volume, which is fillable with brake fluid, communicates hydraulically via a simulator valve with a brake fluid reservoir. The volume of the pedal travel simulator, which is fillable with brake fluid, and the adjacent first pressure chamber are bounded by a rod/simulator piston in the form of a stepped piston.

In addition, the German Patent Application DE 10 2011 006 327 A1 describes a brake system of the brake-by-wire type that includes a master brake cylinder having two pistons that are movably disposed therein, one piston in the form of a stepped piston having at least two hydraulically active surface areas of different sizes, the stepped piston form producing an annular volume that can be filled with hydraulic fluid, respectively brake fluid. In response to the driver actuating the master brake cylinder in the brake-by-wire mode of operation, the smaller active surface area is effective for generating a braking torque at the vehicle wheels, and at a fallback level, i.e., the larger active surface area is effective when there is a malfunction that affects brake system operation; the smaller active surface area changing over to the larger active surface area as a function of a hydraulic pressure prevailing in a pressure chamber in the master brake cylinder (respectively, of the pedal force expended).

SUMMARY

The present invention provides a vehicle brake system.

In conventional approaches, the intake valves of a downstream wheel modulation unit produce a hydraulic flow resistance. This hydraulic flow resistance may cause the brake fluid to dam up between a separator valve and the intake valves of the wheel modulation unit in response to a rapid actuation of the brake pedal at the mechanical fallback level of such a brake system, thereby reducing the useful effect of the annular piston principle.

A specific embodiment of the present invention advantageously counteracts this impairment of function by increasing the outflow resistance to a hydraulic fluid (i.e., brake fluid) reservoir and/or by damping the reduction in pressure in the annular volume path after exceeding the opening pressure of a nonreturn valve.

In response to limited, low pressure in the annular piston chamber and the first brake circuit, the described annular piston approach provides that additional brake fluid volume be displaced into this first brake circuit. This additional amount increases the attainable brake pressure in the first brake circuit during full braking at the mechanical fallback level and, thus, the maximum possible vehicle deceleration.

This effect also compensates for any existing air bubbles in the first brake circuit, leading to a higher maximum brake pressure at the fallback level and, thus, to a shortened stopping distance of the vehicle. The additional volume also provides an improvement of the initial braking performance from the pressureless braking state in that the dead volume in the first brake circuit is overcome more rapidly.

Due to a damping action of the wheel modulation unit's intake valves, the brake fluid does not flow off unhindered into the wheel brakes in response to rapid actuation of the brake pedal at the mechanical fallback level, rather it dams up between the separator valve and the intake valves. This leads to a rapid pressure rise in this intermediate zone.

The result is a maximum inflow of brake fluid from the annular volume path into the first brake circuit, as long as the annular piston pressure exceeds the intermediate space pressure around the operating point of the nonreturn valve in the hydraulic parallel path, and a pressure relief valve does not open. The rapid rise in pressure between the separator valve and the wheel modulation unit produced by the intake valves shortens the time duration of this ideal state.

This maximally beneficial time window may be prolonged by delaying the flow-off of the brake fluid from the annular piston back into the reservoir.

A basic idea underlying one specific embodiment of the present invention is to use a restrictor to increase the flow-off resistance to the reservoir. By properly dimensioning the restrictor, the outflow from the annular volume may be distributed between the nonreturn valve and the pressure limiting valve in favor of the nonreturn valve, thereby enhancing the useful effect. The restrictor may either be serially connected to the pressure limiting valve or replace the nonreturn valve.

The operating principle described above for controlling the supply and return volumetric flow is also applicable to other specific embodiments of brake systems where the buildup of wheel pressure at the mechanical fallback level is optimized by switching between different sized, hydraulically active surface areas. These are each brake systems where, in response to brake pedal actuation, the inflow of additional brake fluid is controlled by mechanically preset pressure differentials (for example, nonreturn valves) between the pressure chamber and the brake-circuit pressure, as well as between the pressure chamber and the brake fluid reservoir. The inventive installation of restrictors "smooths" the transient response when the additional hydraulically active surface areas are switched in and out, and optimizes the active duration of the additional volumetric flow into the wheel brake cylinder by modulating the same to the flow resistances in the acted upon brake circuit(s) (for example, using solenoid valves), thereby maximizing the attainable wheel brake pressure.

The brake fluid from the auxiliary chamber may preferably be transferred into the hydraulic reservoir via the first nonreturn valve and the restrictor, the restrictor increasing the flow-off resistance in terms of the hydraulic fluid flowing through the restrictor toward the hydraulic fluid reservoir.

In accordance with one advantageous specific embodiment of the brake system, the master brake cylinder is designed to include at least one annular prefill chamber as the auxiliary chamber that is formed as the annular volume. Thus, an auxiliary chamber integrated in the master brake cylinder may be used to realize the brake system. In the same way, the rod piston may be in the form of a stepped piston that is couplable to a brake input element, which is actuatable by the vehicle driver and which, together with the second hydraulically active surface area, bounds the auxiliary chamber of the master brake cylinder.

A second nonreturn valve, that may open fluidically toward the first brake circuit, is preferably configured in the fluid line. In this case, the second nonreturn valve may control a transfer of brake fluid from the auxiliary chamber into the first brake circuit.

Moreover, the brake system may additionally include a parallel fluid line that is fluidically coupled at one end to the second brake circuit and, at another end, is fluidically coupled to the auxiliary chamber; a third nonreturn valve, that may open fluidically toward the second brake circuit, being configured in the parallel fluid line. Thus, the third nonreturn valve may also control a transfer of brake fluid from the auxiliary chamber into the second brake circuit.

Another advantageous specific embodiment provides that the brake system include an actuator that is designed to produce a hydraulic fluid pressure separately from the master brake cylinder, and that is fluidically coupled to the first brake circuit and the second brake circuit via fluid lines in each of which a control valve is configured, and that is connected to the hydraulic fluid reservoir. For example, the actuator may be operated electrohydraulically.

In the same way, the brake system may include a pedal feel simulator that is operable over an entire brake-pedal travel that is operable by the driver or over portions thereof. This ensures an agreeable pedal feel for the driver.

Another specific embodiment provides that an accumulator chamber replace a nonreturn valve to limit pressure in the annular prefill chamber. In this specific embodiment, excess brake fluid, which is not needed to build up brake pressure, is not recirculated into the hydraulic fluid reservoir, rather is temporarily stored in an accumulator chamber. By adjusting a preload force and selecting the spring constant, the response pressure of the accumulator chamber and the maximum pressure prevailing in the annular prefill chamber are predefined. Analogously to the variant that includes pressure limiting by a nonreturn valve, it is possible in this specific embodiment as well to optimize the flow-off resistance into the accumulator chamber and thus the time duration of the useful effect.

In another advantageous specific embodiment, the auxiliary chamber communicates with the hydraulic fluid reservoir via an electrically switchable valve. Thus, the atmospheric pressure prevailing in the auxiliary chamber may be adjusted by opening the electrically switchable valve. This has the effect that a braking by the driver no longer counteracts any counter force in the auxiliary chamber.

The accumulator chamber preferably communicates with a line that connects the electrically switchable valve to the auxiliary chamber. Thus, the accumulator chamber may be readily evacuated even without its own connection to the hydraulic fluid reservoir.

The auxiliary chamber preferably communicates via a restrictor with the accumulator chamber. As explained in greater detail below, the restrictor contributes in this case to a significant increase in a brake pressure buildup in at least one wheel brake cylinder in response to a specific brake actuation travel/pedal travel. Brake fluid is transferable, especially in this case, from the auxiliary chamber via the restrictor into the accumulator chamber, the restrictor increasing the flow-off resistance in terms of the hydraulic fluid flowing through the restrictor toward the accumulator chamber.

DETAILED DESCRIPTION

Figure 1A:
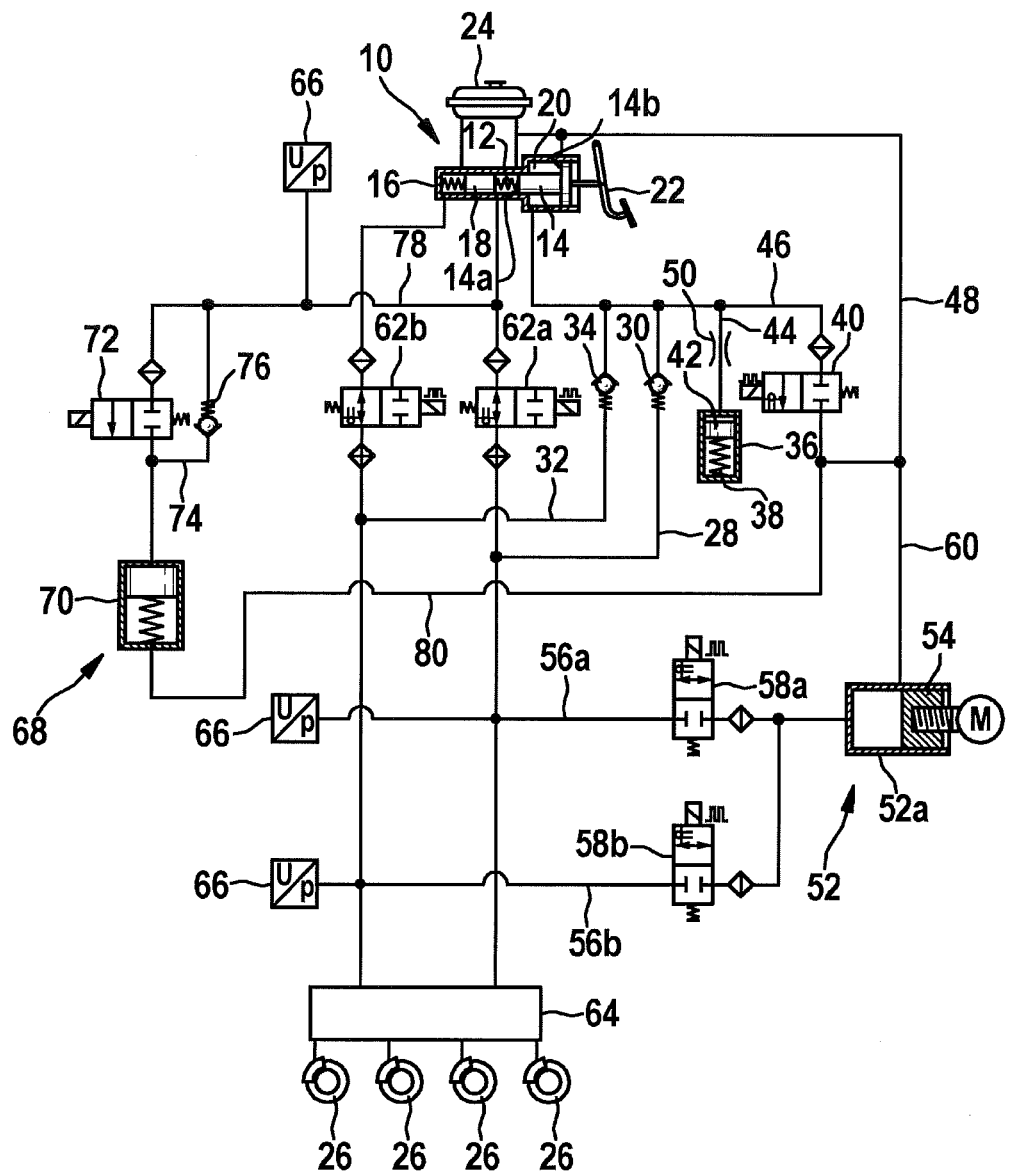
FIGS. 1a and 1b showing a schematic hydraulic circuit plan of a first specific embodiment of the brake system and a coordinate system for clarifying the principle of operation thereof.
Figure 1B:
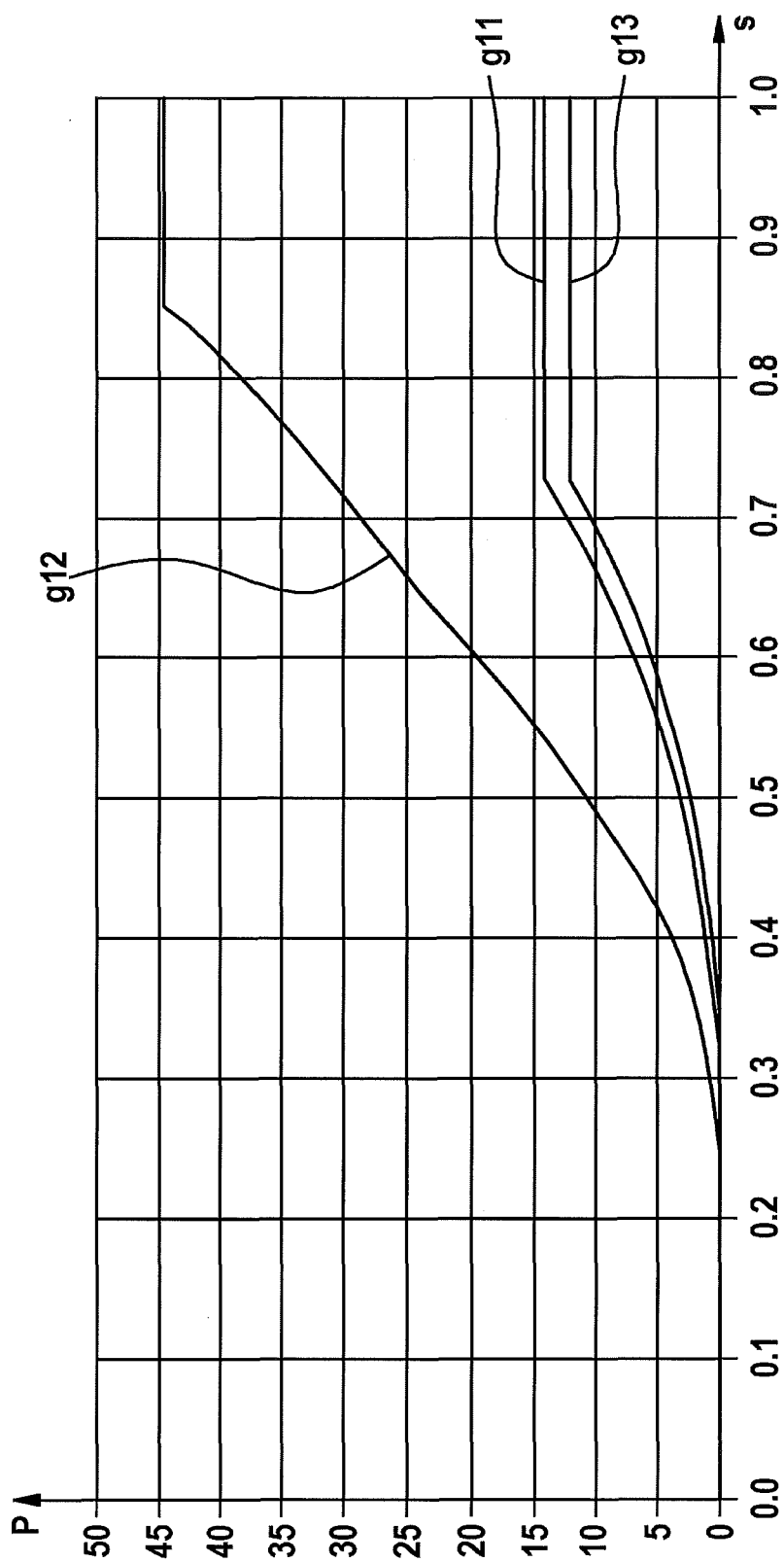

FIGS. 1a and 1b show a schematic hydraulic circuit plan of a first specific embodiment of the brake system and a coordinate system for clarifying the principle of operation thereof.

The brake system schematically illustrated in FIG. 1a may be used in a plurality of vehicle types, such as in hybrid vehicles and electric-powered vehicles, for example. The brake system has a master brake cylinder 10 having a first chamber 12, a rod piston 14, a second chamber 16 and a floating piston 18. Rod piston 14 bounds first chamber 12 by a first hydraulically active surface area 14a. This may be understood to mean that a volume of first chamber 12 that is currently fillable with brake fluid may be reduced by displacing rod piston 14 in a braking direction, while a contact exists between the brake fluid in first chamber 12 and first hydraulically active surface area 14a. Moreover, rod piston 14 is configured with a second hydraulically active surface area 14b or is couplable/coupled thereto; second hydraulically active surface area 14b bounding an auxiliary chamber 20 of master brake cylinder 10 or another brake cylinder. Thus, even a volume of auxiliary chamber 20 (of master brake cylinder 10 or of the other brake cylinder) that is currently fillable with brake fluid may be reduced by displacing second hydraulically active surface area 14b in a braking direction (if a contact exists between the brake fluid in auxiliary chamber 20 and second hydraulically active surface area 14b).

In one specific embodiment of FIG. 1a, auxiliary chamber 20 is a subunit of master brake cylinder 10. In particular, master brake cylinder 10 is designed to include at least one annular prefill chamber 20 as auxiliary chamber 20 that is configured as the annular volume. However, this is to be interpreted as being merely illustrative.

Moreover, rod piston 14 is designed as a stepped piston 14 in a way that allows it, together with second hydraulically active surface 14b, to bound auxiliary chamber 20 of master brake cylinder 10. However, it should be noted that second hydraulically active surface area 14b, which bounds auxiliary chamber 20 of master brake cylinder 10 or of the other brake cylinder, may also be configured on a piston (in addition to rod piston 14 and floating piston 18) used on master brake cylinder 10 or the other brake cylinder. In this case, the coupling of second hydraulically active surface area 14b to rod piston 14 is preferably understood to be a mechanical attachment/connection between rod piston 14 and the further piston that is formed with second hydraulically active surface area 14b. In both cases, rod piston 14 is couplable/connectable to a driver-actuatable brake input element 22 (such as to a brake pedal 22, for example). Thus, second hydraulically active surface area 14b is also displaceable in the braking direction by a braking force exerted by the driver on brake input element 22, thereby reducing the volume of auxiliary chamber 20. Thus, the driver, by his/her driver-exerted braking force, may also build up pressure in auxiliary chamber 20.

The brake system also includes a hydraulic fluid reservoir 24 that is at least fluidically coupled to master brake cylinder 10. This may be understood to mean that chambers 12 and 16 and/or auxiliary chamber 20 of master brake cylinder 10 or of further brake cylinder communicate via at least one bore (for example, at least one breather port) with hydraulic fluid reservoir 24. In the same way, the brake system has at least one first brake circuit, which is fluidically coupled to first chamber 12, and a second brake circuit, which is fluidically coupled to second chamber 16, that are each equipped with/fluidically coupled to braking torque-generating wheel brake cylinders 26. Wheel brake cylinders 26 are configurable on the wheels of the vehicle equipped with the brake system in a way that allows the rotation of the wheels to be decelerated/braked by wheel brake cylinders 26.

FIG. 1a also shows a fluid line 28, which is connected at one end to the first brake circuit and, at another end, (directly or indirectly) to auxiliary chamber 20. Preferably located in fluid line 28 is a first nonreturn valve 30 that is configured/oriented to allow the transfer of brake fluid from auxiliary chamber 20 into first brake circuit via first nonreturn valve 30 in the open state thereof. This makes it possible to intensify a pressure build-up in the at least one wheel brake cylinder 26 of the first brake circuit. Optionally, the brake system additionally includes a parallel fluid line 32, which is connected at one end to the second brake circuit, while another end is (directly or indirectly) connected to auxiliary chamber 20. A second nonreturn valve 34, which may open fluidically toward the second brake circuit, may also be configured in parallel fluid line 32.

In the case of the brake system of FIG. 1a, auxiliary chamber 20 is connected to an accumulator chamber 36. Therefore, in response to a pressure buildup produced in auxiliary chamber 20 by the driver's braking force, brake fluid is able to be pressed out of auxiliary chamber 20 into accumulator chamber 36. This makes it possible to "temporarily store" "excess" brake fluid, in particular, that is not transferred from auxiliary chamber 20 via the at least one fluid line 28 and 32 into the at least one connected brake circuit. The maximum pressure occurring in annular chamber 20 is determined from the characteristic of spring 38 (preload force plus the product of spring stiffness and travel of the accumulator piston); the response pressure of accumulator chamber 36 is derived from the spring preload force. A volume of accumulator chamber 36 may be greater than or equal to a volume of auxiliary chamber 20, so that the entire brake fluid volume of auxiliary chamber 20 is transferable into accumulator chamber 36.

In addition, auxiliary chamber 20 additionally communicates via a valve 40 (solenoid valve) with hydraulic fluid reservoir 24. Thus, auxiliary chamber 20 may communicate directly with hydraulic fluid reservoir 24 in response to an opening of (electrically switchable) valve 40, so that the atmospheric pressure of hydraulic fluid reservoir 24 is present in the auxiliary chamber. Thus, in accordance with the demand, auxiliary chamber 20 may be utilized for amplifying the brake pressure buildup in the at least one brake circuit that is connected to the at least one fluid line 28 and 32, or be "switched off" by a direct connection to hydraulic fluid reservoir 24. In a standard braking situation, particularly if a brake power assist unit (not shown) of the brake system is available, auxiliary chamber 20 communicating directly with hydraulic fluid reservoir 24 (by opening of valve 40) may ensure that the driver is initiating the desired brake pressure buildup and thereby has an agreeable brake actuation feel (pedal feel) merely by using a comparatively small, first hydraulically active surface area 14a. However, for a rapid braking (such as for an emergency braking, for example) or for a braking to be performed without the brake power assist unit, auxiliary chamber 20 may be used to intensify the brake pressure buildup in response to a closing of valve 40. Therefore, the brake system features an effective "mechanical fallback level." Additionally, the moment of closing of valve 40 may be slightly delayed in order to thereby improve the pressure buildup dynamics.

Upon closing of valve 40, brake fluid is transferred from auxiliary chamber 20 into the at least one brake circuit connected to the at least one fluid line 28 and 32 in response to a respective closing pressure of the at least one nonreturn valve 30 and 34. Thus, (upon closing of valve 40), the particular closing pressure of the at least one nonreturn valve 30 and 34 defines a minimal pressure differential between a pressure prevailing in auxiliary chamber 20 and a pressure prevailing in the at least one brake circuit connected (via the at least one fluid line 28 and 32), starting at which the brake fluid transfer occurs. A spring characteristic of accumulator chamber spring 38 defines a maximally attainable pressure in auxiliary chamber 20. (The maximum pressure typically correlates to a sum of a spring preloading and a product of a spring stiffness and a travel of an accumulator piston 42 of accumulator chamber 36.) If the pressure prevailing in auxiliary chamber 20 exceeds the minimal pressure differential preset by the at least one nonreturn valve 30 and 34, then brake fluid flows from auxiliary chamber 20 into the at least one connected brake circuit. The transfer of brake fluid continues until either the minimal pressure differential is undershot due to the rise in the pressures prevailing in the at least one connected brake circuit, or until the opening pressure of accumulator chamber 36 is exceeded. Starting with the exceedance of the maximum pressure, brake fluid is (also) transferred from auxiliary chamber 20 into accumulator chamber 36.

Accumulator chamber 36 preferably communicates (via a line section 44) with a line 46 that connects valve 40 to auxiliary chamber 20. (The at least one fluid line 28 and 32 may lead into line 46.) Once the braking action has ended, the brake fluid "temporarily stored" in accumulator chamber 36 may be transferred in this case via line section 44 into auxiliary chamber 20. Thus, there is no need for an additional connection of accumulator chamber 36 to hydraulic fluid reservoir 24, for example, via an external return line to hydraulic fluid reservoir 24. Thus, a hydraulic aggregate/hydraulic block of the brake system features a comparatively low expenditure for bores and may, therefore, be manufactured inexpensively.

It is particularly advantageous when auxiliary chamber 20 communicates via a restrictor 50 with accumulator chamber 36. Restrictor 50 may be placed in line section 44, for example. In the context of an air inclusion in the brake system, the damping action of restrictor 50 may advantageously contribute most notably to the brake pressure increase in wheel brake cylinders 26, as is illustrated with reference to the coordinate system of FIG. 1b.

The coordinate system of FIG. 1b indicates a brake actuation travel s (pedal travel) as an abscissa, by which brake actuation element 22 (brake pedal 22) is displaced by the driver's braking force out of the powerless initial position thereof. The ordinate of the coordinate system of FIG. 1b indicates the corresponding brake pressure p (in bar) in a wheel brake cylinder 26, wheel brake cylinder 26 being connected to a brake circuit with the inclusion of air.

Graphs g11 and g12 indicate pressure values that are ascertained at the brake system of FIG. 1a equipped with accumulator chamber 36 and restrictor 50. The pressure values of graph g11 are measured, provided that restrictor 50 has a comparatively large cross-sectional area. Graph g12 shows higher pressure values; inductor 50 having a comparatively small inductor cross section when the pressure values of graph g12 are determined. If the brake system is not equipped with restrictor 50, the pressure values of graph g13 are still ascertained because accumulator chamber 36 is connected to auxiliary chamber 20. The pressure values of graph g12 are, in fact, lower than those of graphs g11 and g12, but are still higher than comparable related art values where there is no an auxiliary chamber 20 and no accumulator chamber 36. It is, thus, already advantageous over the related art to equip the brake system merely with accumulator chamber 36.

Thus, the brake system of FIG. 1a also includes an actuator 52 that is designed to produce a hydraulic fluid pressure separately from master brake cylinder 10. Actuator 52 may preferably be operated electrohydraulically. Actuator 52 is a plunger 52 having an electromotor M, for example. In this case, electromotor M may be driven to move a piston 54 of plunger 52 in a plunger housing 52a back and forth via a forward, respectively backward drive, making it possible to increase or reduce a pressure prevailing at least in plunger housing 52a. Actuator/plunger 52 is preferably fluidically coupled to the first brake circuit and the second brake circuit via fluid lines 56a and 56b, in each of which a control valve 58a and 58b is configured. Actuator/plunger 52 may also be connected via further line sections 60 and 48 to hydraulic fluid reservoir 24. Moreover, the first brake circuit and the second brake circuit may each be connected via a separator valve 62a and 62b to master brake cylinder 10. Thus, in response to a closing of respective separator valve 62a and/or 62b and an opening of respective control valve 58a and/or 58b, the brake pressure prevailing in the first brake circuit and/or the second brake circuit may be adjusted by actuator/plunger 52 independently of an actuation of brake actuation element 22/of an internal pressure prevailing in master brake cylinder 10. However, equipping the brake system of FIG. 1a with actuator/plunger 52 is to be interpreted as being merely illustrative.

Moreover, the brake system may also have an ESP system 64, which may be used to additionally vary the pressure prevailing in wheel brake cylinders 26, for example, for executing an ESP function. (The ESP system 64 includes, for example, the intake and exhaust valves.) A pressure sensor 66 may also be configured at different locations of the brake system.

In the same way, the brake system may also optionally include a pedal feel simulator 68 that is operable over an entire brake-pedal travel that is operable by the driver or over portions thereof. Pedal feel simulator 68 may be constituted of (another) pressure accumulator 70, a control valve 72, and a bypass fluid line 74 that extends parallel to control valve 72 and that has a nonreturn valve 76. Pedal feel simulator 68 may be connected to first brake circuit via a line 78. Moreover, pedal feel simulator 68 may be connected via a line 80, which leads into line 48, for example, to hydraulic fluid reservoir 24.

Figure 2:
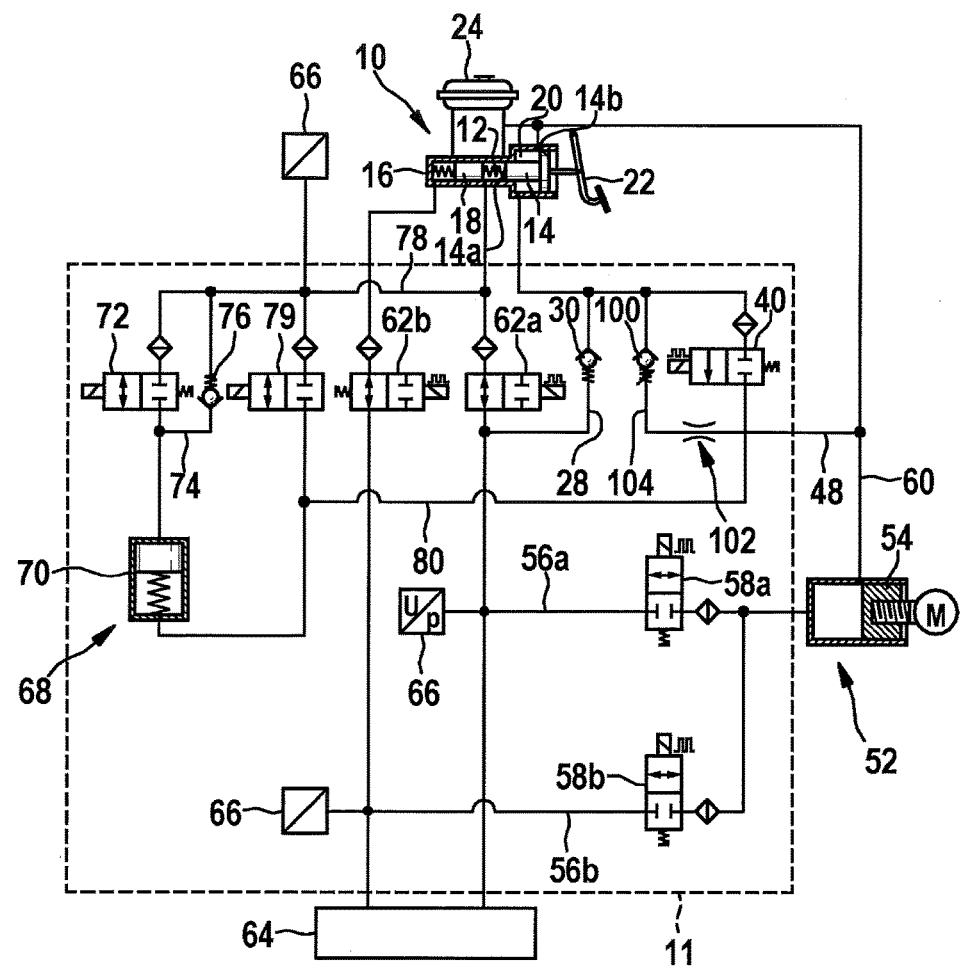
FIG. 2 showing a schematic hydraulic circuit plan of a second specific embodiment of the brake system.

FIG. 2 shows a schematic hydraulic circuit plan of a second specific embodiment of the brake system.

Alternatively to accumulator chamber 36, a third nonreturn valve 100 and a restrictor 102, which are configured in a further fluid line 104, are connected to auxiliary chamber 20 in the brake system of FIG. 2. Auxiliary chamber 20 communicates via third nonreturn valve 100 and restrictor 102 with hydraulic reservoir 24 in a way that makes brake fluid transferable from auxiliary chamber 20 via third nonreturn valve 100 and restrictor 102 into hydraulic reservoir 24, restrictor 102 increasing the flow-off resistance in terms of the hydraulic fluid flowing through restrictor 102 toward hydraulic reservoir 24. A maximally adjustable pressure in auxiliary chamber 20 may also be set by nonreturn valve 100 and restrictor 102. It is thus ensured that a pressure differential between annular piston chamber 20 and the brake circuit connected via nonreturn valve 30, that is suited for the additional supplying of fluid to the brake circuit, should be retained for as long as possible. Thus, a positive pressure differential is retained between the pressure prevailing in auxiliary chamber/annular prefill chamber 20 and the pressure in a connected brake circuit as long as possible, since, otherwise, wheel brake cylinder 26 (not shown) is supplied accordingly with hydraulic fluid.

Moreover, in the case of the brake system of FIG. 2, a valve 79 is also placed in hydraulic aggregate 11 parallel to pedal feel simulator 79.

Figure 3A:
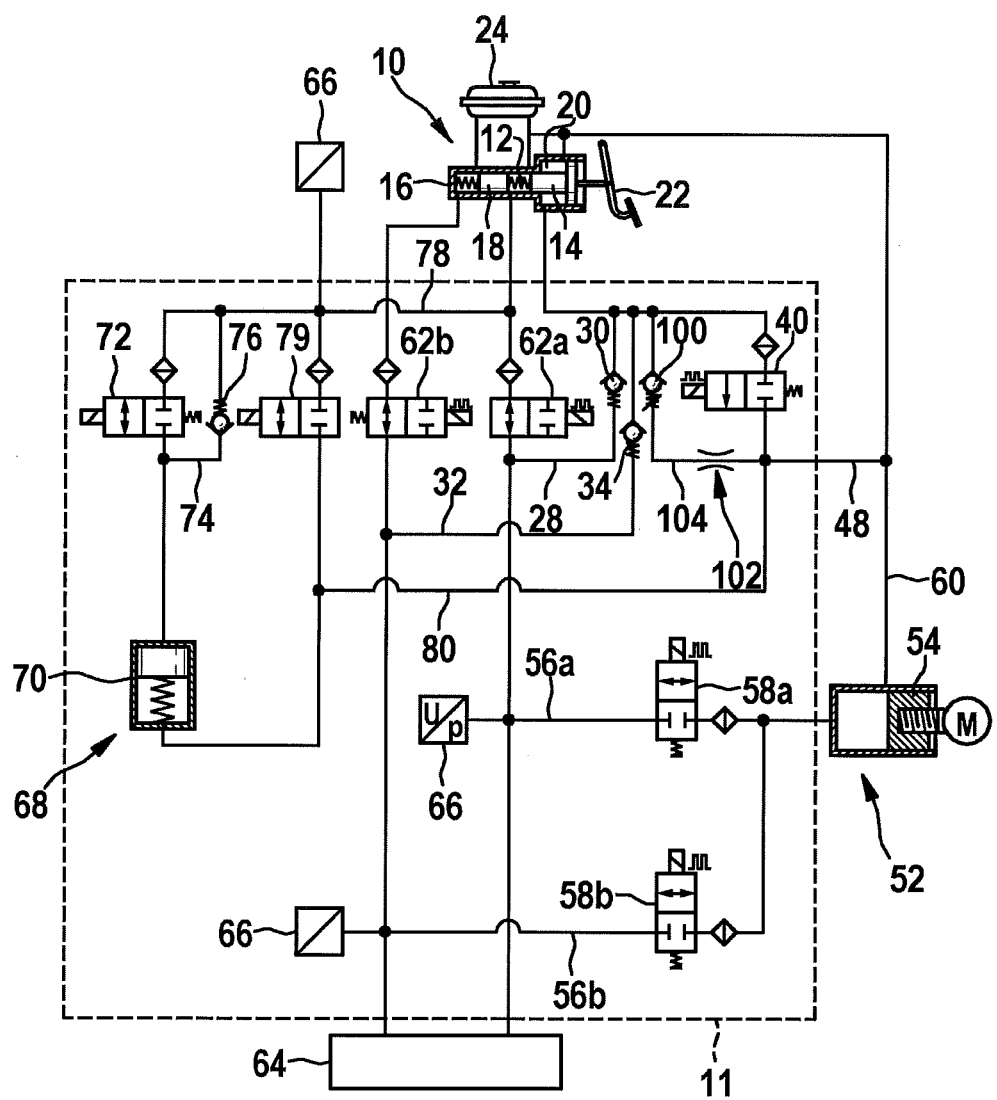
FIGS. 3a and 3b showing a schematic hydraulic circuit plan of a third specific embodiment of the brake system and a coordinate system for clarifying the principle of operation thereof.
Figure 3B:
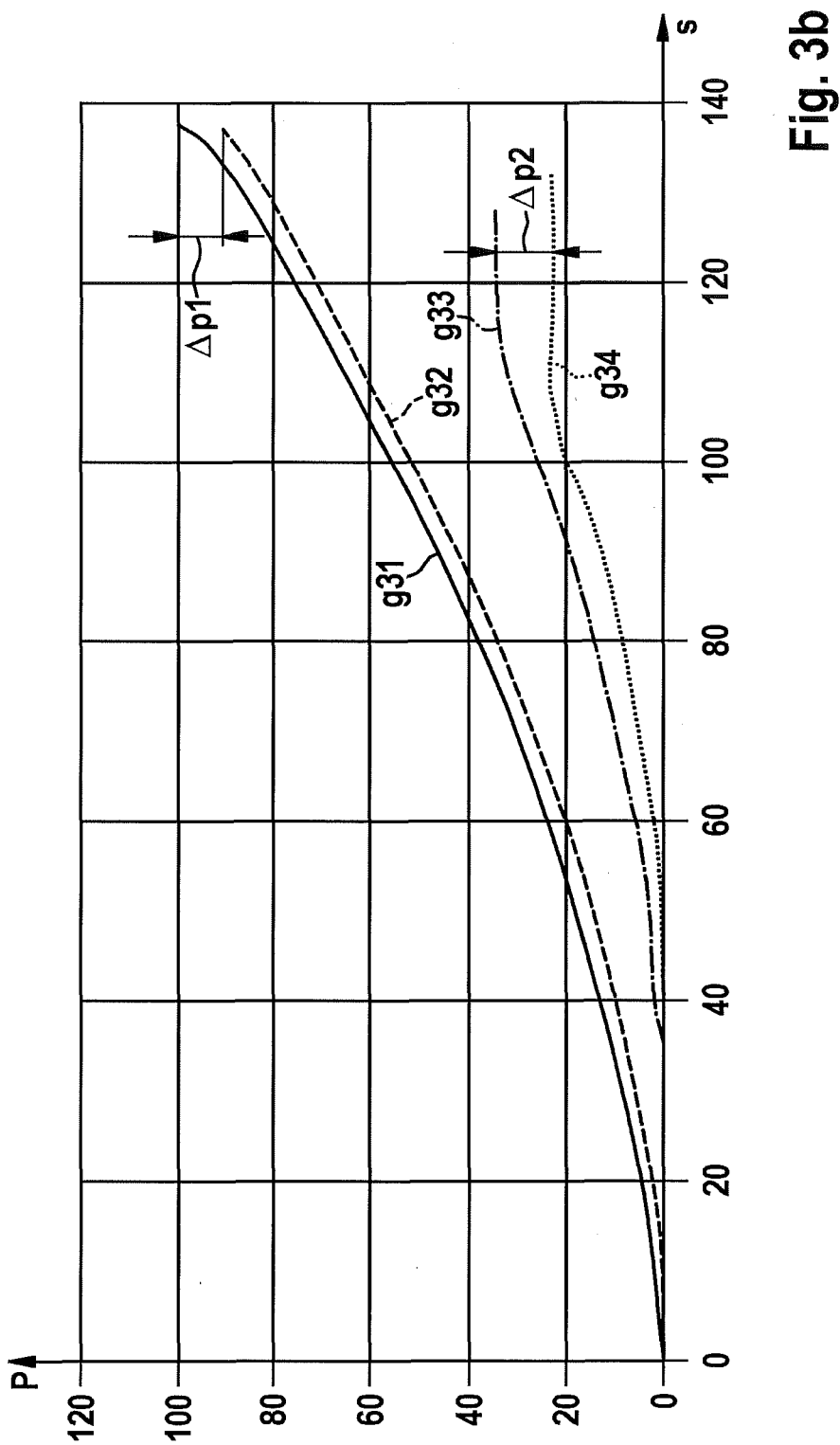

FIGS. 3a and 3b show a schematic hydraulic circuit plan of a third specific embodiment of the brake system and a coordinate system for clarifying the principle of operation thereof.

FIG. 3a shows a hydraulic circuit plan of a third specific embodiment of the brake system, this further specific embodiment essentially differing from that explained earlier by parallel fluid line 32 having nonreturn valve 34 configured therein. Nonreturn valve 34 opens fluidically toward the second brake circuit, so that, as described above, in response to actuation of master brake cylinder 10, the second brake circuit may be additionally supplied with hydraulic fluid.

The idea underlying this specific embodiment illustrated in FIG. 3a resides in also extending the useful effects described above to the second brake circuit by duplicating fluid line 28, whereby the vehicle braking performance is further improved at a mechanical fallback level.

In response to (limited, low) pressure in additional volume 20, the approach mentioned above, which employs a stepped piston 14 that forms an annular volume, displaces additional brake fluid volume into the first brake circuit and into the second brake circuit. This additional amount increases the attainable brake pressure (during full braking) at the mechanical fallback level and, thus, the maximum possible vehicle deceleration.

As the abscissa, the coordinate system of FIG. 3b indicates brake actuation travel s (pedal travel) (in mm). The ordinate of the coordinate system of FIG. 3b indicates corresponding brake pressure p (in bar) in a wheel brake cylinder 26.

A graph g31 shows brake pressures p prevailing in response to a specific brake actuation travel s in a wheel brake cylinder 26 of first brake circuit 3a, provided that there is no air/no inclusion of air in the first brake circuit. Graph g32 indicates brake pressures p that are reached in the same situation (brake circuit without air/without the inclusion of air), but in the case that restrictor 102 is not used. Without air/without the inclusion of air, it is readily discernible here that the maximally attainable pressures (with and without restrictor 102) differ by a significant first pressure differential Δp1 of approximately 9 bar.

Moreover, a graph g33 shows brake pressures p that are still attainable in a wheel brake cylinder 26 of the first brake circuit of FIG. 3a, even in the case of an inclusion of air in the first brake circuit (approximately 3 cm$^3$ air). In the same situation (approximately 3 cm$^3$ air in the brake circuit), only brake pressures p represented by a graph g34 may be realized if restrictor 102 is not used.

For the (realistic) case where there is approximately 3 cm$^3$ of air in the first brake circuit, the maximally attainable pressures (with and without restrictor 102) differ by a significant second pressure differential Δp2 of approximately 10 bar. Thus, the positive "damping action" is significant for an increase in wheel pressure at the mechanical fallback level. (These are characteristic curves that are simulated by an exemplary brake system and restrictor geometry.)

Possible specific embodiments of master brake cylinder 10, illustrated, in each instance, in a schematic cross-sectional view, and the respective principle of operation are briefly discussed with reference to FIG. 4 through 8 (i.e., 8a, 8b, 8c). In a detailed view, FIG. 4 through 7 each show a portion of the brake system of FIG. 2, namely the portion that illustrates master brake cylinder 10 in conjunction with actuator 52 and pedal feel simulator 68. FIG. 8a through 8c merely show other possible embodiments of the master brake cylinder in consideration of the combination of hydraulically active surface areas of a piston (FIGS. 8a and 8c), respectively of a plurality of pistons (FIG. 8b).

Figure 4:
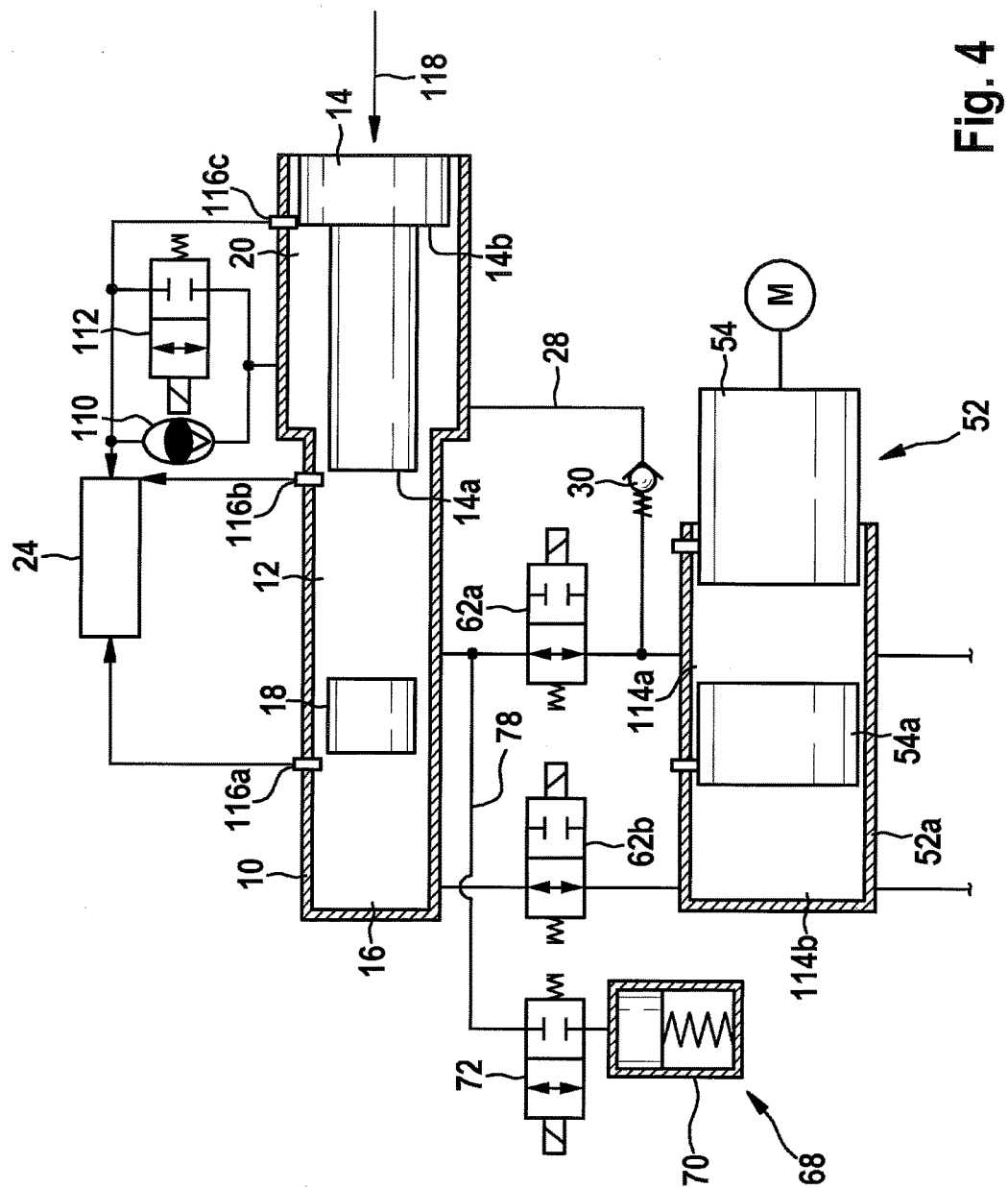
FIG. 4 showing a detail view of an exemplary specific embodiment of a master brake cylinder including a few essential components.

FIG. 4 shows a cross-sectional view of master brake cylinder 10 (what is generally known as a "parallel plunger"), as well as rod piston 14 having hydraulically active and couplable surface areas 14a and 14b, auxiliary chamber/annular prefill chamber 20, chambers/pressure chambers 12 and 16, floating piston 18, which separates chambers 12 and 16 from one another, and hydraulic fluid reservoir 24.

Above master brake cylinder 10, next to hydraulic fluid reservoir 24, the illustration in FIG. 4 shows a pressure limiting valve 110, as well as what is generally referred to as a "fast-fill disable" valve 112. It is noted that, in addition to pressure chamber 36 and/or in addition to components 100 and 102, valves 110 and 112 may be installed in the brake system.

Actuator 52 features a housing 52a, in which piston 54, which is coupled to the drive (here: electromotor M) and a floating piston 54a are located. Pressure chambers 114a and 114b that are fillable with hydraulic fluid are formed by the configuration of pistons 54 and 54a.

Hydraulic fluid reservoir 24 is fluidically coupled via breather ports 116a, 116b and 116c, in each case to chambers/master-brake-cylinder pressure chambers 12 and 16 and to auxiliary chamber 20.

In the case of a malfunction of the brake system, the driver has the option, by exerting a force indicated by an arrow 118, i.e., by depressing brake pedal 22 (not shown here), to displace rod piston 14 to build up pressure in chambers 12 and 16, that is ultimately directly transmitted via the fluid lines to wheel brake cylinder 26 (not shown here) to produce braking torques at the wheels. This is possible since a pressure building up in auxiliary chamber 20 due to second hydraulically active surface area 14b that would make an effective braking much more difficult and against which the driver would have to exert a force of comparable magnitude, is reduced by switching through valve 112, so that the driver ultimately "brakes" using the second hydraulically active surface area 14b. In this respect, hydraulically active surface areas 14a and 14b are intercoupled in terms of function.

Figure 5:
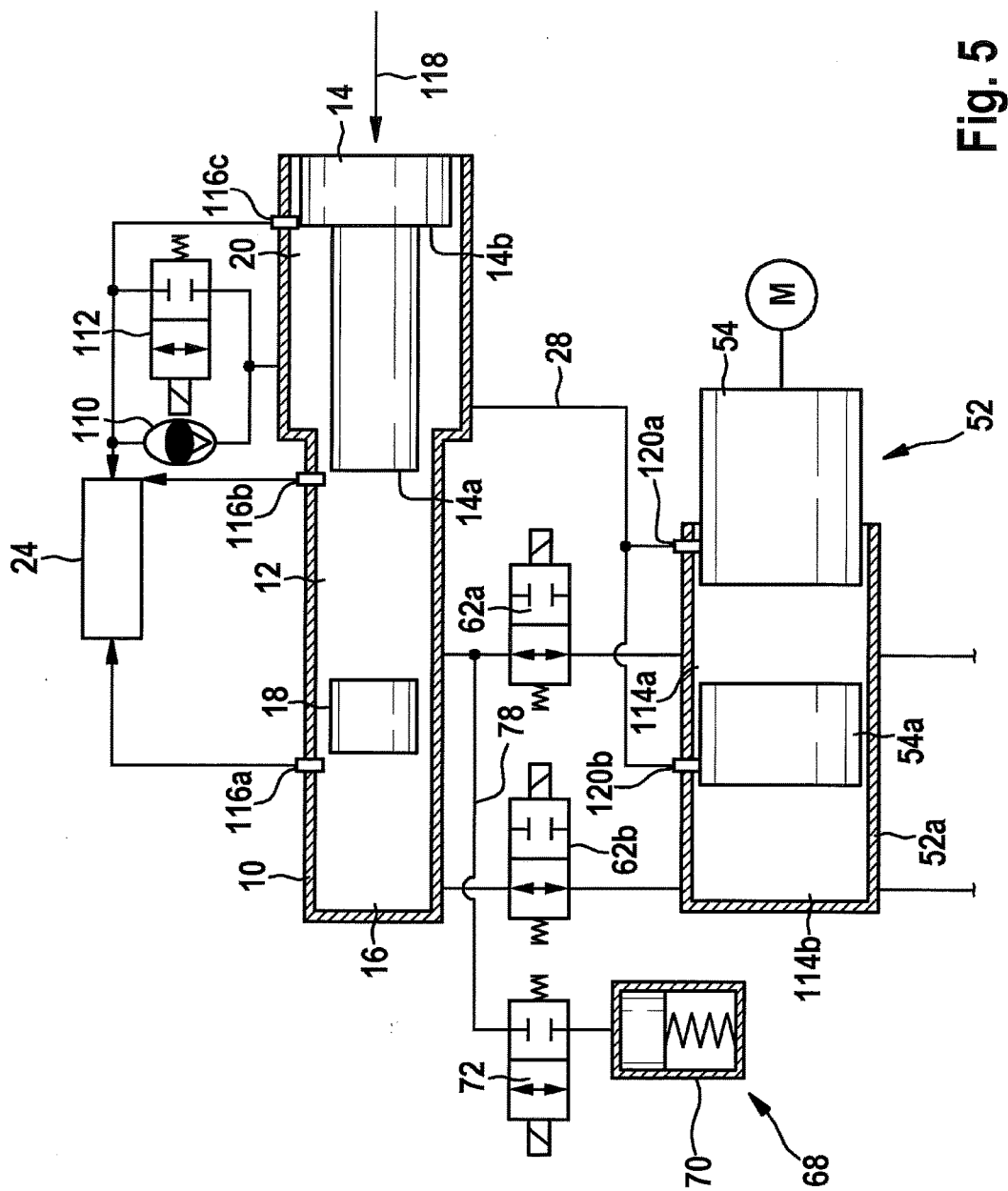
FIG. 5 showing a detail view of another exemplary specific embodiment of a master brake cylinder, including a few essential components.

FIG. 5 shows a configuration similar to the specific embodiment illustrated in FIG. 4, with the difference that fluid line 28 is fluidically coupled via breather ports 120a and 120b to housing 52a of actuator 52, breather ports 120a and 120b each acting as nonreturn valves, analogously to nonreturn valve 30 shown in FIG. 4.

Figure 6:
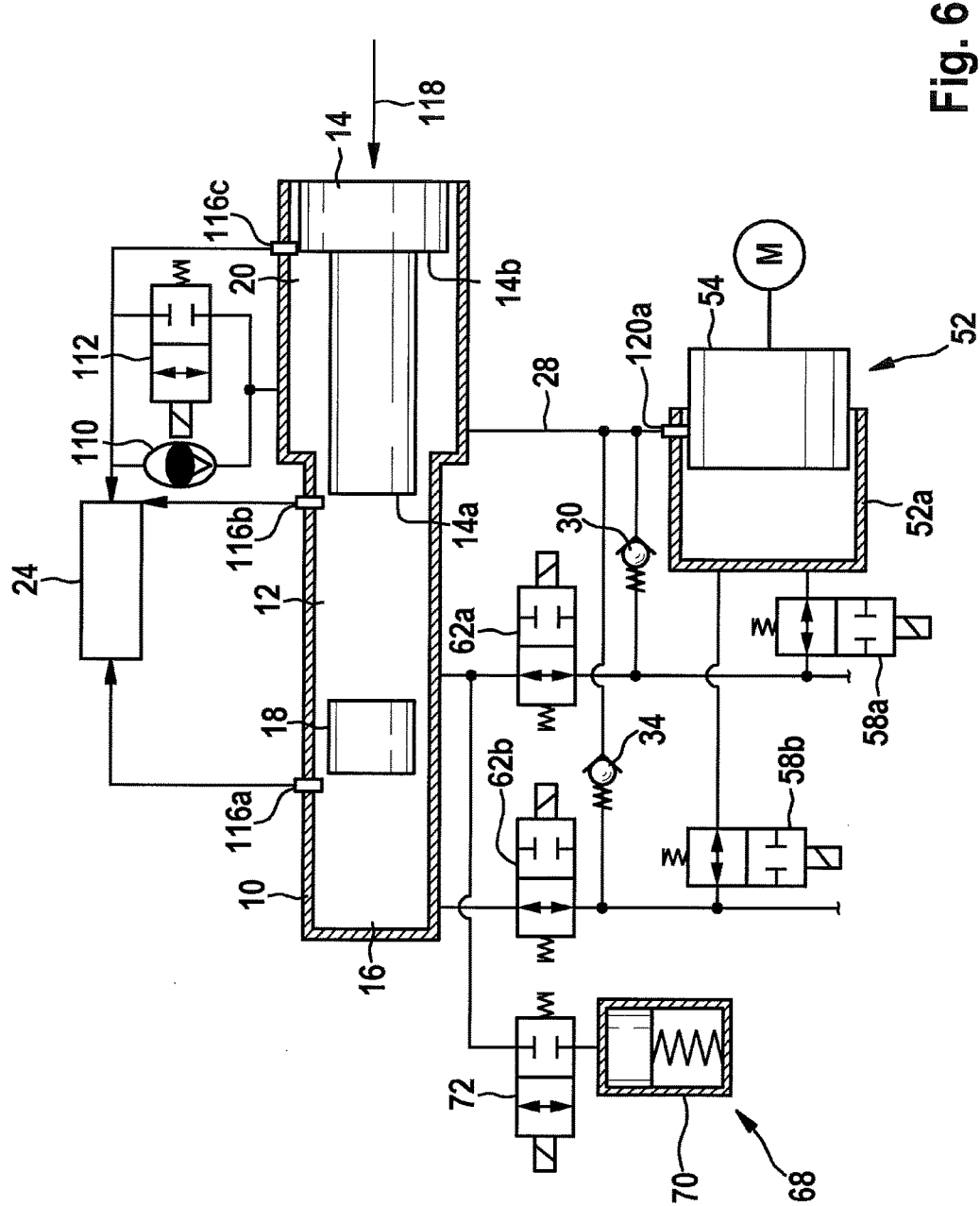
FIG. 6 showing a detail view of another exemplary specific embodiment of a master brake cylinder, including a few essential components.

FIG. 6 shows another exemplary specific embodiment. With reference to the representation in FIG. 5, the distinction being in this case that, instead of breather ports 120a and 120b acting as nonreturn valves, only one breather port 120a is illustrated in housing 52a of actuator 52, as well as nonreturn valves 30 and 34 that are fluidically coupled in each instance to the first brake circuit or the second brake circuit and auxiliary chamber 20.

Figure 7:
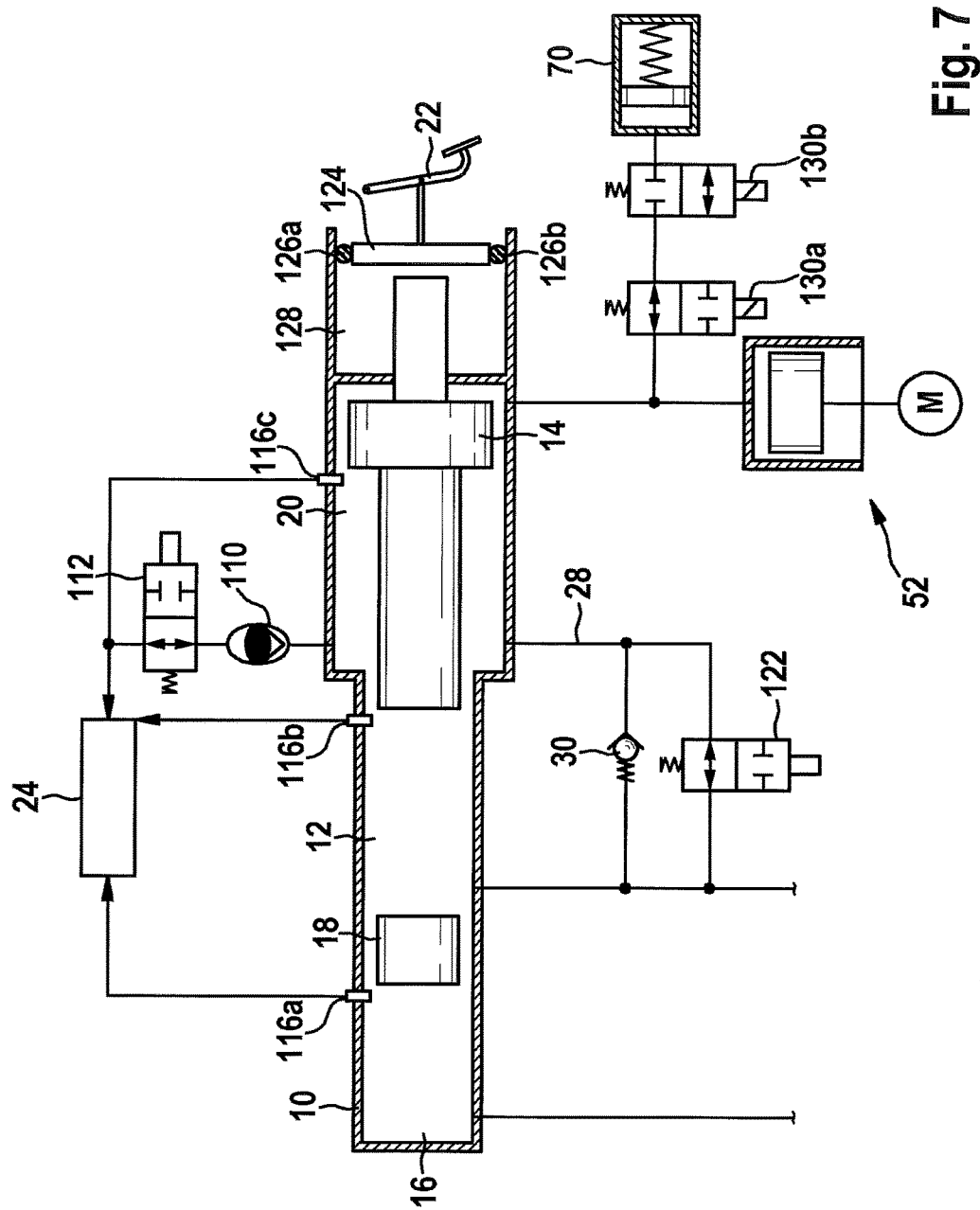
FIG. 7 showing a detail view of another exemplary specific embodiment of a master brake cylinder, including a few essential components.
Figure 8A:
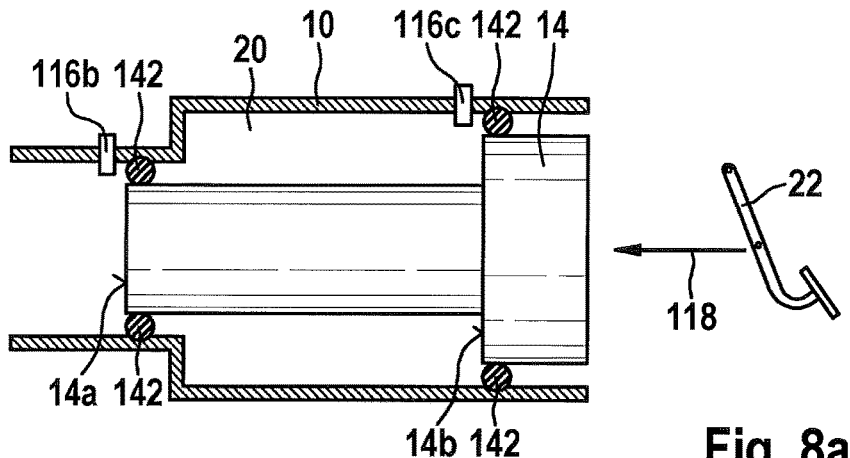
FIG. 8a through 8c showing other exemplary specific embodiments schematically illustrated in a cross-sectional view of merely one portion of the master brake cylinder in terms of combining hydraulically active surface areas of the piston, respectively of a plurality of pistons.
Figure 8B:
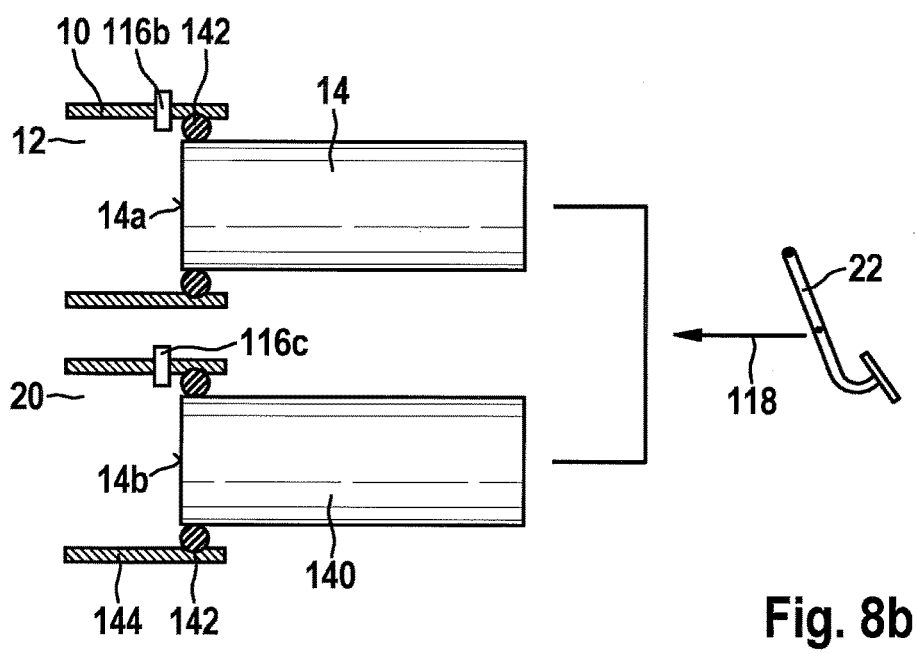
Figure 8C:
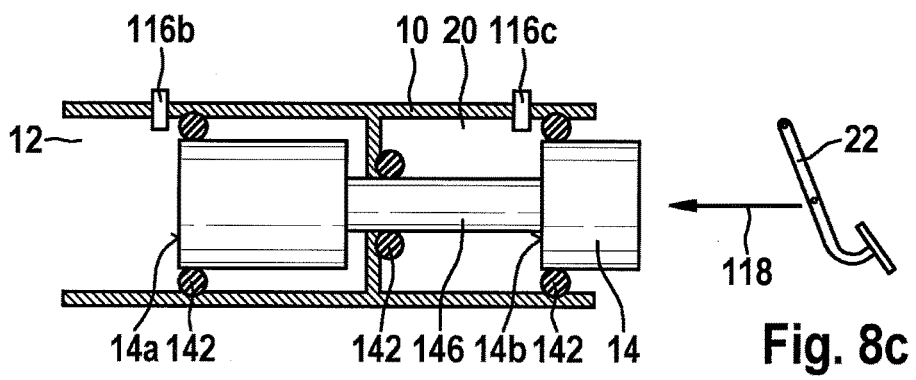

FIG. 7 (what is generally referred to as a "serial plunger") shows an exemplary specific embodiment where nonreturn valve 30 and a separator valve 122 connected parallel thereto are fluidically coupled between the auxiliary chamber and the first brake circuit. In addition, the design of master brake cylinder 10 is such that, configured at one end of master brake cylinder 10 is a pressure plate 124 that is coupled to brake pedal 22 and is guided via seals 126a and 126b in the master brake cylinder housing. It should be thereby noted that pressure plate 124 is mechanically decoupled from stepped piston 14. Between pressure plate 124 and stepped piston 14, an additional pressure chamber 128 is formed that is fluidically coupled to pedal feel simulator 68 (pedal travel simulator), two series-connected valves 130a and 130b being fluidically coupled both to actuator 52, as well as to pressure accumulator 70. Although pressure plate 124 (respectively, brake pedal 22) is not mechanically coupled to stepped piston 14, a corresponding pedal feel may be conveyed to the driver via pedal feel simulator 68 (pedal travel simulator) that is fluidically coupled to pressure chamber 128. The fall back level function described above with reference to FIG. 4 through 6 is also ensured by the specific embodiment illustrated in FIG. 7.

In the sense of an overview of other possible piston forms having hydraulically active surface areas 14a and 14b, FIG. 8a through 8c merely show a portion of master brake cylinder 10, respectively of at least two pistons 14 and 140 (FIG. 8b) that are coupled in terms of a force 118 exerted by the driver via the brake pedal, respectively brake input element 22; in each case, above mentioned breather ports 116a, 116b and 116c (FIG. 8b) and piston seals 142 being shown. (The specific embodiment illustrated in FIG. 8a essentially corresponds to that illustrated in FIG. 4; is again shown in FIG. 8a, however, for purposes of a comparison providing an overview.)

It is intended that the further specific embodiments shown in FIG. 8a through 8c clarify that there are a plurality of differently designed types of master brake cylinder 10 having at least two or a plurality of hydraulically active and force-controlled surface areas 14a and 14b, other embodiments being conceivable, i.e., they are not limited to the specific embodiments shown here.

As is discernible in FIG. 8b, it is merely optional to integrate auxiliary chamber 20 into master brake cylinder 10. Alternatively, auxiliary chamber 20 may also be configured in a further brake cylinder 144; a piston 140 of further brake cylinder 144, including second hydraulically active surface area 14b configured thereon, being at least partially adjustable into auxiliary chamber 20.

Moreover, second hydraulically active surface area 14b may be formed on a rod piston 14 having a tapered intermediate portion 146. Thus, a plurality of different master brake cylinders 10/brake cylinders 144 are suited for realizing the brake systems described above.

It is also noted that the above described functions of the brake power assist unit may be activated or deactivated for what are generally referred to as operation OK, (i.e., thus for an operation without malfunctions), and, in each case, hydraulic fluid may be fed into one and/or two (or a plurality of) brake circuits of the vehicle.

What is claimed is:

1. A brake system for a vehicle, comprising:
   a master brake cylinder that includes:
      a first chamber,
      a rod piston, which, together with at least one first hydraulically active surface area bounds the first chamber,
      a second chamber, and
      a floating piston, wherein:
         the rod piston is configured with or couplable to a second hydraulically active surface area, and
         the second hydraulically active surface area bounds an auxiliary chamber of the master brake cylinder or of another brake cylinder;
   a hydraulic fluid reservoir that is fluidically coupled to at least the master brake cylinder;
   at least one first brake circuit, which is fluidically coupled to the first chamber, and a second brake circuit, which is fluidically coupled to the second chamber, each brake circuit fluidically coupled to braking torque-generating wheel brake cylinders; and
   a fluid line that is fluidically coupled at one end to at least the first brake circuit and, at another end, is fluidically coupled to the auxiliary chamber, wherein the auxiliary chamber is attached to at least one of an accumulator chamber and the hydraulic reservoir via a first nonreturn valve and a restrictor that is configured in a further fluid line, wherein the first chamber, the second chamber, and the auxiliary chamber amount to three chambers of the master brake cylinder, and wherein the first chamber, the second chamber, and the auxiliary chamber occupy different regions of an interior of a housing of the master brake cylinder.

2. The brake system as recited in claim 1, wherein brake fluid is transferable from the auxiliary chamber via the first nonreturn valve and the restrictor into the hydraulic reservoir, and the restrictor increases a flow-off resistance in terms of a hydraulic fluid flowing through the restrictor toward the hydraulic fluid reservoir.

3. The brake system as recited in claim 1, wherein the master brake cylinder includes at least one annular prefill chamber as the auxiliary chamber that is configured as an annular volume.

4. The brake system as recited in claim 1, further comprising a second nonreturn valve, that may open fluidically toward the first brake circuit, configured in the fluid line.

5. The brake system as recited in claim 4, further comprising:
   a parallel fluid line that is fluidically coupled at one end to the second brake circuit and, at another end, is fluidically coupled to the auxiliary chamber; and
   a third nonreturn valve that can open fluidically toward the second brake circuit and is configured in the parallel fluid line.

6. The brake system as recited in claim 3, wherein the rod piston includes a stepped piston that is couplable to a brake input element that is actuatable by a vehicle driver and that, together with the second hydraulically active surface area, bounds the auxiliary chamber of the master brake cylinder.

7. The brake system as recited in claim 1, further comprising an actuator that is configured for generating a hydraulic fluid pressure separately from the master brake cylinder, and which is coupled via fluid lines, in each of which a control valve is configured, is fluidically coupled to the first brake circuit and the second brake circuit, and which communicates with the hydraulic fluid reservoir.

8. The brake system as recited in claim 7, wherein the actuator is electrohydraulically operable.

9. The brake system as recited in claim 1, further comprising a pedal feel simulator that is operable over an entire brake-pedal travel that is operable by a driver or over portions thereof.

10. The brake system as recited in claim 1, wherein the auxiliary chamber communicates via an electrically switchable valve with the hydraulic fluid reservoir.

11. The brake system as recited in claim 10, wherein the accumulator chamber communicates with a line that connects the electrically switchable valve to the auxiliary chamber.

12. The brake system as recited in claim 1, wherein the auxiliary chamber communicates via a restrictor with the accumulator chamber.

13. The brake system as recited in claim 12, wherein brake fluid is transferable from the auxiliary chamber via the restrictor into the accumulator chamber, the restrictor increasing a flow-off resistance in terms of a hydraulic fluid flowing through the restrictor toward the accumulator chamber.

14. The brake system as recited in claim 1, further comprising:
   a fast-fill disable valve, wherein:
      the master brake cylinder includes a breather port through which the auxiliary chamber is in direct fluidic communication with the fast-fill disable valve, and
      a pressure buildup in the auxiliary chamber is reduced via the fast-fill disable valve in response to a displacement of the rod piston.

15. The brake system as recited in claim 1, wherein:
   a first breather port extends through the housing of the master brake cylinder and opens directly into the first chamber,
   a fluid line at one end is directly connected to the first breather port and at another end is directly connected to the hydraulic fluid reservoir,
   a second breather port extends through the housing of the master brake cylinder and opens directly into the second chamber,
   a fluid line at one end is directly connected to the second breather port and at another end is directly connected to the hydraulic fluid reservoir, a third breather port extends through the housing of the master brake cylinder and opens directly into the auxiliary chamber, and a fluid line at one end is directly connected to the third breather port and at another end is directly connected to the hydraulic fluid reservoir.

16. The brake system as recited in claim 6, wherein:

the interior of the housing of the master brake cylinder includes a pressure plate disposed transverse to a longitudinal axis of the housing, a fourth pressure chamber in the interior of the housing is formed by the pressure plate and the stepped piston, the fourth pressure chamber is coupled to a pedal feel simulator that is operable over an entire brake-pedal travel that is operable by a driver of the vehicle or over portions thereof.

17. The brake system as recited in claim 16, wherein the pressure plate is mechanically decoupled from the stepped piston.

\* \* \* \* \*